US005772176A

United States Patent [19]
Keck et al.

[11] Patent Number: 5,772,176
[45] Date of Patent: Jun. 30, 1998

[54] MOTOR MOUNTING SYSTEM

[75] Inventors: Arthur C. Keck; Robert K. Hollenbeck, both of Fort Wayne, Ind.

[73] Assignee: General Electric Company, Fort Wayne, Ind.

[21] Appl. No.: 612,468

[22] Filed: Mar. 7, 1996

[51] Int. Cl.⁶ .................................................... F16M 3/00
[52] U.S. Cl. ............................................ 248/638; 248/675
[58] Field of Search .................................. 248/638, 644, 248/645, 672, 674, 675, 604

[56] References Cited

U.S. PATENT DOCUMENTS

| | | | |
|---|---|---|---|
| 3,848,837 | 11/1974 | Dochterman | 248/672 |
| 4,200,257 | 4/1980 | Litch, III | 248/604 |
| 4,293,114 | 10/1981 | Lykes | 248/672 X |
| 4,849,667 | 7/1989 | Morrill | 248/675 X |
| 5,454,543 | 10/1995 | Carrico | 248/672 |

FOREIGN PATENT DOCUMENTS

551418  2/1943  United Kingdom ................... 248/672

*Primary Examiner*—Ramon O. Ramirez
*Attorney, Agent, or Firm*—Enrique J. Mora

[57] ABSTRACT

A vibration isolating mounting system for an electric motor comprising includes a plurality of mounting arms formed from rod stock and each having one segment extending generally parallel to an axis of the motor and another segment extending generally perpendicular to the motor axis. The one is swaged at an end to create a pair of spaced protrusions. A plurality of circumferentially spaced retainers are mounted on the motor and adapted for passage of the end of the one segment when the arm is rotationally positioned to align the spaced protrusions in a first orientation. After insertion of the one end, the arm is rotated to align the protrusions away from the first orientation such that the protrusions engage the retainer and prevent axial motion of the one segment. In another form, a second retainer is spaced from the first retainer and the one end of each arm passes through both retainers to provide additional support between the arm and motor.

28 Claims, 6 Drawing Sheets

FIG_1 PRIOR ART

FIG_2 PRIOR ART

FIG_3

FIG_4

FIG_5

FIG_6

FIG_7

FIG_8

FIG_9

FIG_10

FIG_11

FIG_12

FIG_13

MOTOR MOUNTING SYSTEM

FIELD OF THE INVENTION

This invention relates in general to electric motors and in particular to motor mounting arrangements, devices for mounting an electric motor and methods of mounting such devices.

BACKGROUND OF THE INVENTION

In air moving apparatus incorporating blowers, the blower wheels are supported within blower housings which are typically dimensioned and positioned such that relatively close running tolerances are maintained in the interest of maximizing blower efficiency. In direct drive applications, the motor is suspended from the blower housing, and a motor shaft in turn supports and drives the blower wheel within the housing. Examples of apparatus wherein mounting arrangements of this type are utilized include forced air furnaces, air circulation fans, and the like.

In applications where the blower is mounted directly to the motor shaft, it is believed to be desirable to isolate motor vibrations from the housing structure so as to minimize the transmission of noise thereby achieving quieter operation. Not only must mounting arrangements reduce the transmission of motor vibration, but they must provide sufficient mounting rigidity to avoid excessive axial and tilting movement of the motor during operation. In the past, to achieve these ends, motor mounting arrangements have been provided with mounting arms which had low torsional spring constants to isolate the torsional vibrations of the motor, and yet had sufficient strength to withstand not only the vibrations encountered during operation but also the shipping and handling loads for the motor and blower assemblies. Such prior art mounting arrangements are disclosed in U.S. Pat. No. 4,063,060 issued Dec. 13, 1977 to Ernest W. Litch III and U.S. Pat. No. 4,373,696 issued Feb. 15, 1983 to Richard W. Dochterman and U.S. Pat. No. 4,482,124 issued Nov. 13, 1989 to Richard W. Dochterman.

In many instances, it has been desirable to permanently attach mounting arms to a motor shell or housing, using welding or other techniques, when the motor is manufactured. When the motor is shipped, these mounting arms must be accommodated in the shipping containers requiring larger containers than for motors without mounting arms. Larger containers result in lower product density and increase shipping and storage expense. Furthermore, the fixed location of permanently attached mounting arms requires precision placement of mounting holes on any assembly to which the motor is to be mounted. For example, if this motor is to be mounted to a direct drive blower, the mounting holes in the blower assembly must be precisely located to match the mounting arms and assure that the motor shaft aligns with an axis of the blower. In addition, other motor mounting designs are applied to plain round motors by the original equipment manufacturers that are usually assembled with many loose parts such as arms and a bellyband. This type of mounting utilizes rubber isolation grommets to reduce axial and radial motor vibrations but have, by their nature, very high torsional spring constants, i.e., very stiff arms, and cannot isolate motor torsional vibrations. Accordingly, it would be desirable to provide a motor mounting system which overcomes the above and other disadvantages of the prior art.

SUMMARY OF THE INVENTION

It is a general object of the present invention to provide an improved mounting system for an electric motor.

It is a more specific object of the present invention to provide an electric motor mounting system using mounts which require less packaging space than prior art integral mounts.

It is another object of the present invention to provide an electric motor mounting system which can accommodate deviations in location of mounting holes for motor mounts.

It is yet another object of the present invention to isolate motor vibration, axial, radial and torsional directions.

It is yet another object of the present invention to provide an electric motor mounting system which allows adjustment of motor alignment.

It is still another object of the present invention to provide an electric motor mounting system which is adjustable and is tightly coupled to the motor for maintaining motor positioning accuracy.

It is yet another object of the present invention to provide a motor mounting system which can be collapsed for ease of handling of the motor.

The above and other objects, features and advantages will be in part apparent and in part pointed out in the description to follow. In general, the invention is implemented in an electric motor adapted for direct drive of a blower or similar apparatus in which the motor is suspended by the mounting system within an enclosure, such as an air inlet in an air handling system. In an exemplary embodiment, the mounting system includes a plurality of mounting arms each having a first segment extending generally parallel to the motor and a second segment extending generally perpendicular to the first segment. The second segment has a distal end formed with a termination suitable for attaching the mounting arm to a support. The first segment has a pair of spaced protrusions extending radially from the first segment adjacent an end opposite the second segment. A plurality of spaced retainers are circumferentially spaced about the motor with each retainer adapted to receive the end of a respective one of the first segments. The retainers are shaped to pass the first segment and its protrusions when the arm is rotated to a non-mounting position, the protrusions preventing axial movement of the arms when the arm is rotated to a mounting position.

In one form, the retainers comprise a plurality of metal straps circumferentially spaced about and extending above an outer surface of the motor. Each of the straps form a generally triangular-shaped opening aligned generally parallel to the axis of the motor for receiving a respective one of the ends of the first segments. The ends of the first segments pass through the straps when the first segment is rotated to align the protrusions angularly downward, i.e., at the interface junction between the strap and base. When the arms are rotated, the protrusions align angularly outward and engage the strap to retain the bracket since the protrusions react against the edges of the straps to retain the first segments in position. The straps may be integrally formed in a housing of the motor or may be formed in a band circumscribing the motor and then clamped to the motor. Alternately, the straps could be formed in individual brackets that are attached to a shell of the motor.

In still another embodiment of the invention, the retainer comprises a plurality of circumferentially spaced lobes formed in laminations of the motor with generally elongated apertures extending through the lobes parallel to the axis of the motor. The apertures are configured to pass ends of the first segment when the first segments are rotated in a first position so that the protrusions on the first segment are generally aligned tangential to the motor's circumference and along the major axis of the aperture. Preferably, the apertures through the lobes are formed with a tear-drop shape or a shape similar to that used in the mounting brackets. However, any elongated shape which allows passage of the protrusions when the first segments are rotated to the first position and retention when the first segments are rotated out of the first position would be satisfactory.

In either implementation of the invention, the first segment may include a slight bow which displaces a portion of the first segment between the spaced protrusions with the bow aligned such that when the first segment is inserted through the aperture in either the laminations or in the brackets, the bow aligns with the primary axis of the elongate shape aperture. When the mounting arm is rotated to align the protrusions along the secondary axis of the aperture, the bow moves with the protrusions and causes the mounting arm to be tightly clamped against the shell.

In still another form of the invention, the retaining bracket may be formed with a plurality of circumferentially oriented corrugations sized to fit snugly about one of the protrusions on the first segment. In this embodiment, the first segment is inserted into the bracket in the same manner as described above but when rotated, the protrusion slips into one of the preformed corrugations and prevents the first segment from moving axially.

In yet another form of the invention, the motor shell or housing may be formed with an outwardly extending flange adjacent one end. Holes are formed through the flange aligned with a respective one of a plurality of spaced retainers circumferentially spaced about the motor with each retainer adapted to receive the end of a respective one of a plurality of mounting arms. Each retainer is shaped to pass a first end of an arm when the arm is rotated to a non-mounting position. Similarly, the first end of the arm can be passed through a respective hole in the flange when the arm is rotated to a selected position. Each arm has at least one radially extending protrusion which prevents passage through the retainer and flange unless the arm is rotated to the non-mounting position. When the arm is passed through the flange and retainer, rotation of the arm causes the protrusion to be brought into engagement with a side of the retainer for restraining the arm to the motor. In this form of the invention, the motor is supported in two positions, i.e., at the flange and the retainer, to improve stability.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
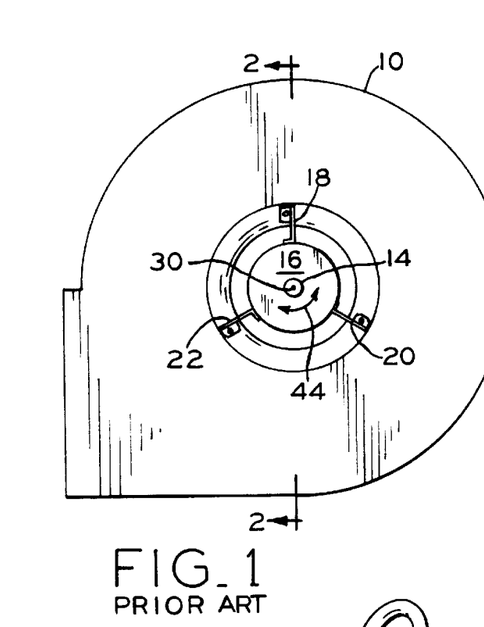
FIG. 1 is a simplified representation of a blower assembly and housing with which the present invention may be used.
Figure 2:
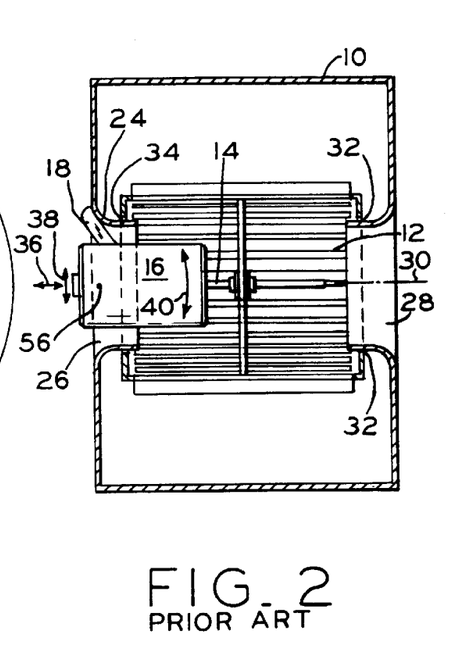
FIG. 2 is a cross-sectional view taken along lines 2—2 of FIG. 1.

Turning now to FIGS. 1 and 2, there is illustrated a motor mounting system exemplary of the prior art which includes a combination of a blower housing 10 and a blower wheel 12 coupled in direct drive relationship with a shaft 14 of a single phase induction motor 16. Three torsionally flexible mounting arms 18, 20, 22 connect the motor to the blower housing 10. In the illustrative embodiment, the motor is directly mounted to the blower housing 10 along the curved scroll 24 which defines an air inlet 26 at one side of the housing, the housing also having a second air inlet 28 coaxial with inlet 26 and the rotational axis 30 of motor 16.

Running clearances 32, 34 are provided between the blower wheel 12 and housing 10, and these clearances must be maintained during operation. The amount of clearance may vary from one blower assembly to another, but generally is kept as small as manufacturing tolerances and the selected mounting arrangement will permit in order to minimize blower losses and thus maximize blower efficiencies.

Vibrations are inherently generated during operation of motor 16. These vibrations have different modes, and four different vibrational modes have been denoted by arrows 36, 38, 40, 44 in FIGS. 1 and 2. With more specific reference to FIG. 2, the motor 16 tends to undergo an axial mode of vibration and thus tends to oscillate in the direction of the arrow 36. In addition, motor 16 tends to vibrate radially as indicated by the arrow 38 and undergo tilting vibratory movement as represented by the arrow 40. For purposes of the present discussion, the tilting mode of vibration of motor 16 may be considered to be a rocking type of movement about the point 56. However, radial and tilting mode vibrations may occur in planes other than the vertical plane as represented in FIG. 2. In FIG. 1, arrow 44 represents the vibratory direction of movement of motor 16 due to torsional mode vibrations of motor 16 about its rotational axis 30 during operation.

Since motor 16 is mounted directly to the blower housing 10, it will be appreciated that all of the various modes of vibrations of the motor may be transmitted directly to the housing. The housing 10, in turn, may then act as a sounding board and may amplify the vibrational sounds and noises generated by the motor, depending on the transmissibility of the mounting arrangement for the different vibrational modes. Moreover, these sounds may be transmitted directly through duct work connected to housing 10 or by the air mass being moved by the blower wheel 12.

From the above discussion, it will be apparent that a primary concern of blower design manufacturers is to develop mounting arrangements for motors that avoid the transmission of vibration into the housing or the duct work associated with the motor. Furthermore, it is desirable to provide methods of assembly of the motor to the blower housing that minimizes any requirement for precise alignment in order to avoid vibrational modes. Still further, it is desirable to provide a mounting system for motors which minimizes the space required for shipping the motors and the associated mounting system to manufacturers of the blower system for assembly of the blower motor to the blower.

In the embodiment illustrated in FIGS. 1 and 2, the motor 16 is supported to the housing by the brackets 18, 20, 22 which are welded to the outer shell 60 of the motor. The brackets themselves are formed from sheet spring steel and are not capable of being folded or collapsed for shipment of the motor.

Figure 3:
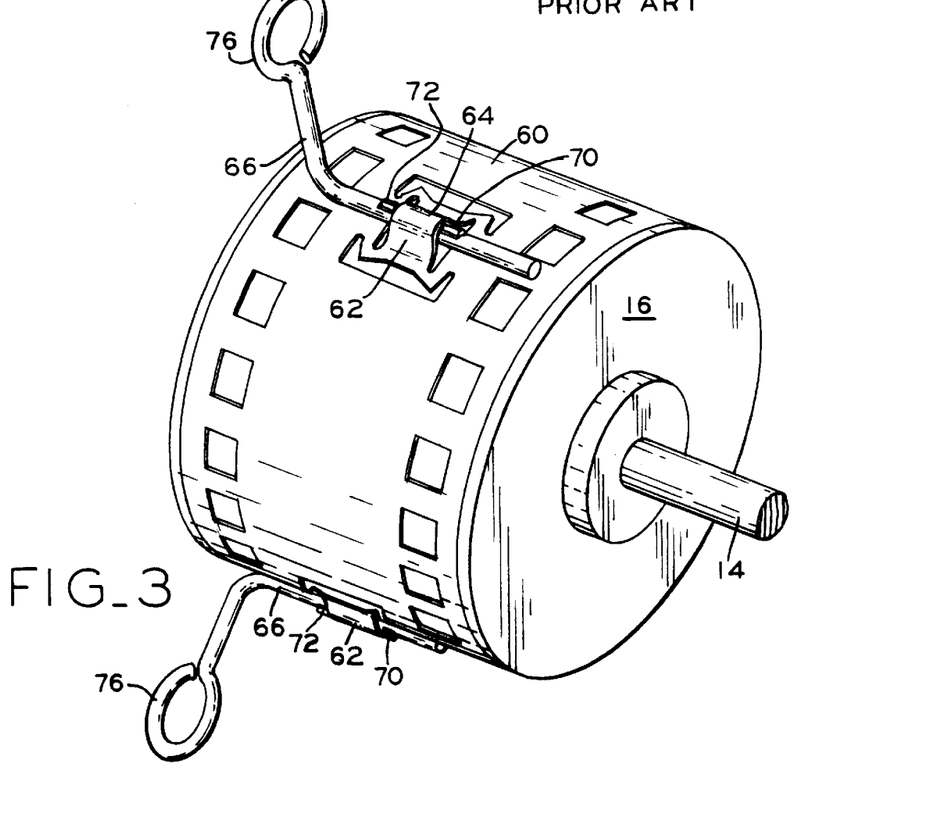
FIG. 3 is a perspective view of a blower motor incorporating one form of my inventive mounting system.

Turning now to FIG. 3, there is shown a first embodiment of the present invention in which the outer shell 60 of a conventional blower motor such as that illustrated in FIGS. 1 and 2 is formed with circumferentially spaced bracket retention members defined by punching the shell during its manufacture. Each of the bracket retention members, illustrated at 62, include a central strap portion 64 defining a strap-like member extending above the outer surface of the shell 60. The strap portion 64 may be punched outward by use of a conventional die and has a generally triangular configuration. More particularly, the portion 64 has a height which is somewhat less than its width at the shell 60. Each of the strap portions 64 is sized to pass an end of a mounting bracket 66 formed out of a conventional piece of steel rod stock typically having a diameter of about ¼ inch. The end of the bracket 66 which fits into the mounting strap 64 is formed with two radial protrusions or swaged ears 70 and 72 which are spaced apart approximately the axial width of the strap portion 64. The ears or protrusions 70,72 are deformed from the round rod of bracket 66 by pinching or crimping of a portion of the circumference of the rod using a conventional swaging process. The radial extent of the swaged ears beyond the circumference of bracket 66 is selected such that the bracket may be rotated to a first position such that the ears extend angularly downward and are generally aligned with the intersection between the strap 64 and the motor shell 60 so that the bracket can be slid into and through the strap 64. Once the first swaged ear 70 has passed through the strap portion 64, the bracket can be rotated such that the swaged ears extend in a radial direction with respect to the shell 60 and therefore engage opposite sides of the strap 64 and prevent the bracket from sliding axially through the strap portion. Furthermore, the bracket 66 is preferably bowed to a slight extent in the area of the swaged ears so that as the bracket is rotated, the bowed portion turns upward causing the bracket to bind against the strap portion and eliminate any looseness between the retention member 62 and the bracket 66. The resulting tight fit between the member 62 and the bracket 66 eliminates any vibration caused by a loose connection between the bracket and the motor shell 60. It will also be noted that the bracket may be formed with one end having a loop 76 which can be used to mount the rod to an external surface such as the housing 10 shown in FIGS. 1 and 2. For this purpose, it is typical to bend the bracket at 77 so that the portion containing the loop is oriented generally perpendicular to that portion passing through the retention member 62.

Figure 4:
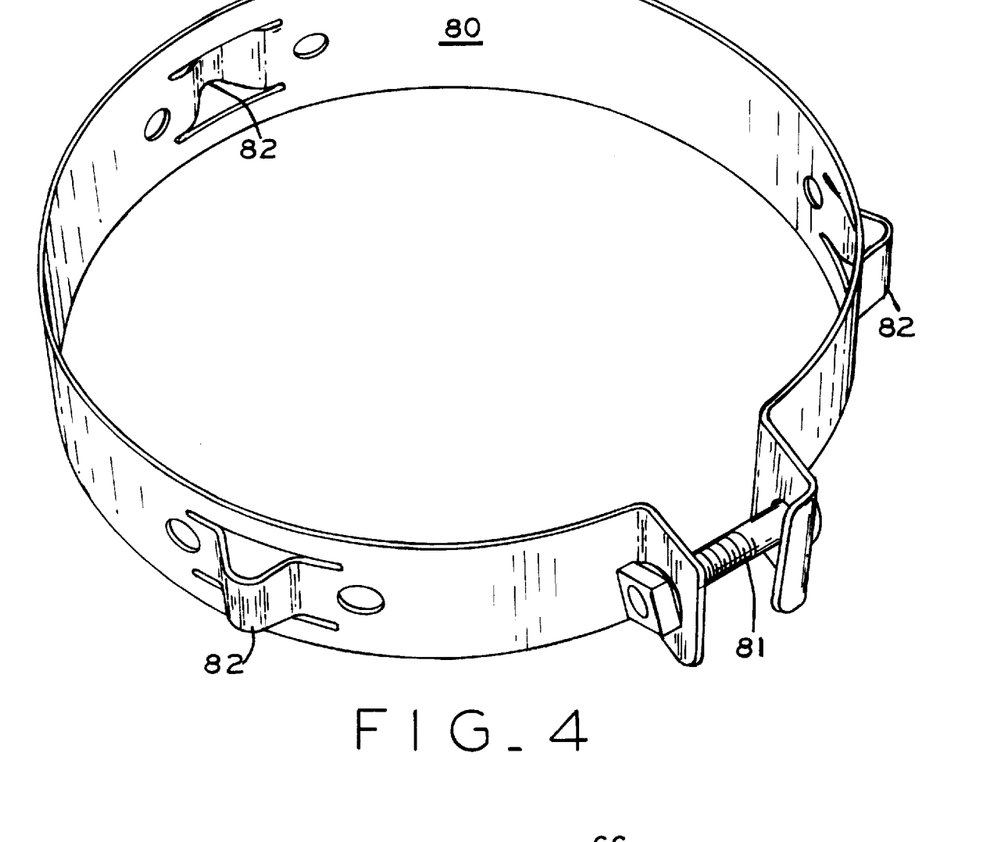
FIG. 4 is a perspective view of motor band which may be used in practicing my invention in another form.

Rather than forming the outer shell 60 of the motor with integral brackets as shown in FIG. 3, it is also possible to achieve essentially the same benefit by creating a bellyband 80 as shown in FIG. 4 which can be fit around the outer shell of the motor. The bellyband can include retention members 82 substantially identical to the retention members 62. The bellyband can be tightened about the motor shell 60 using a conventional nut and bolt arrangement 81. This embodiment simplifies motor construction by eliminating the need for formation of retention members in the motor shell. However, it does require installation of the band about the motor.

Figure 5:
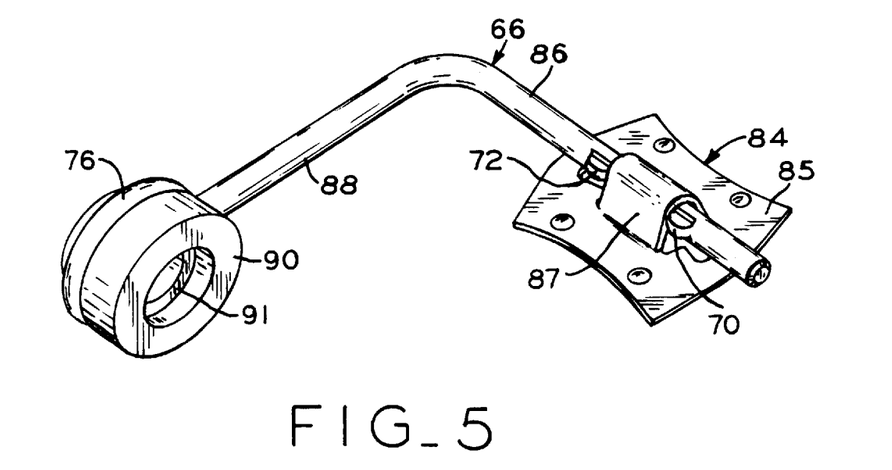
FIG. 5 illustrates still another form of my inventive mounting system.

Turning now to FIG. 5, there is shown a still further embodiment of the present invention utilizing separate retention members 84 which are attached at circumferentially spaced locations to the outer shell 60 of the motor. As will be noted from the figures, the retention member 84 has essentially the same configuration as the punched retention member 62 of FIG. 3. Each retention member 84 includes a base 85 and a loop or strap 87. The strap 87 is preferably formed by a punch press in a conventional, well known manner by punching the strap from the base 85. In the embodiment of FIG. 5, the mounting bracket 66 is shown in its conventional bent configuration having a first segment 86 designed to extend generally parallel to an axis of the motor and a second segment 88 extending generally perpendicular to the first segment. The end of the first segment 88 includes the loop 76 shown in FIG. 3 fitted with a conventional elastomer grommet 90. The grommet 90 provides additional flexible connection between the motor and the blower housing 10. The grommet 90 has an opening 91 therethrough for reception of a fastener (not shown) which is secured to housing 10. Grommet 90 provides a cushioned support for the motor and reduces transfer of vibration between the motor and housing in the axial and radial direction.

Each retention member 84 is preferably attached to the motor shell 60 using a TOG-L-LOC® fastener thereby eliminating the need for additional fastening components such as rivets or screws and the need for any heating of the metal such as occurs in welding. In a TOG-L-LOC® system, the sheet metal member 84 is clamped in a desired location on shell 60 using a spring pressure pad. A punch and die are brought together on opposite sides of the two pieces and the punch forces a small diameter section of both pieces into the die. The metals are squeezed in the die and flow outward forming a secure interlock. Details of the TOG-L-LOC® process are available from BTM Corp. of Marysville, Mich.

Referring to FIGS. 6, 7, 8 and 9, there are shown end top plan views and side views of an alternate embodiment of retention member 84, designated as member 84', mounted on shell 60 rather than being integrally formed as illustrated in FIG. 3. The member 84' functions identically to member 84 but is manufactured by bending the base member 85' to form a loop or strap 87' rather than punching the strap from the base member as described with regard to FIG. 5.

Figure 6:
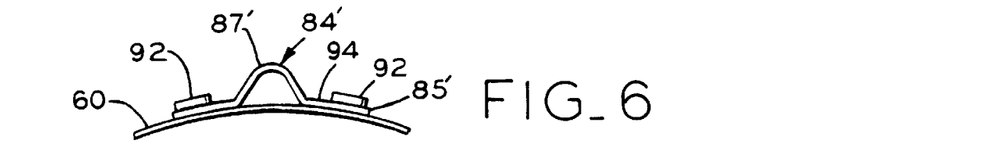
FIG. 6 is an enlarged end view of one form of mounting retainer for use with my inventive mounting system.

FIG. 6 is an end view of member 84 mounted on an outer surface of a motor shell 60 using TOG-L-LOC® fastening. The fastening process forms an extrusion 92 that extends above the outer surface 94 of member 84. The extrusion 92 is a hollow, deformed extrusion of shell 60 which is flattened by the die so as to form a rivet-like attachment.

Figure 7:
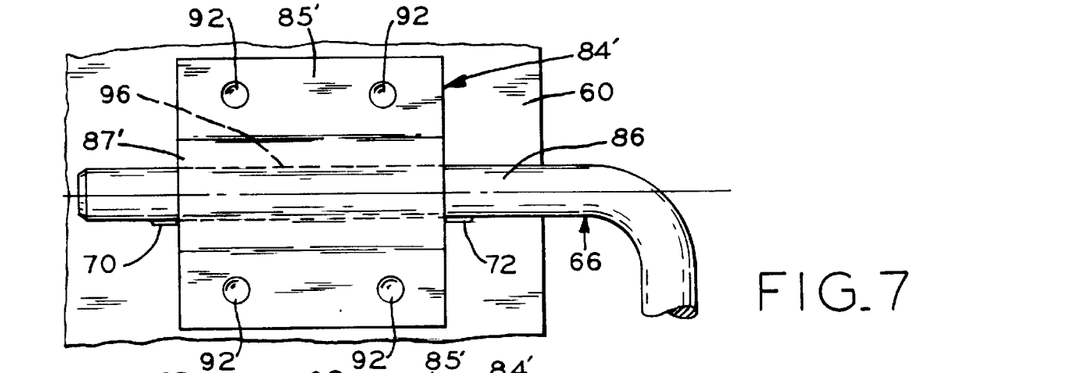
FIG. 7 is a plan view of the retainer of FIG. 6 with the retaining arm rotated to an installation position.

FIG. 7 is a top view illustrating the protrusions or swaged ears 70, 72 on the first segment 86 of bracket 66 angularly aligned so as to allow segment 86 to pass into the triangular-shaped opening through retention member 84'.

Figures 8, 9:
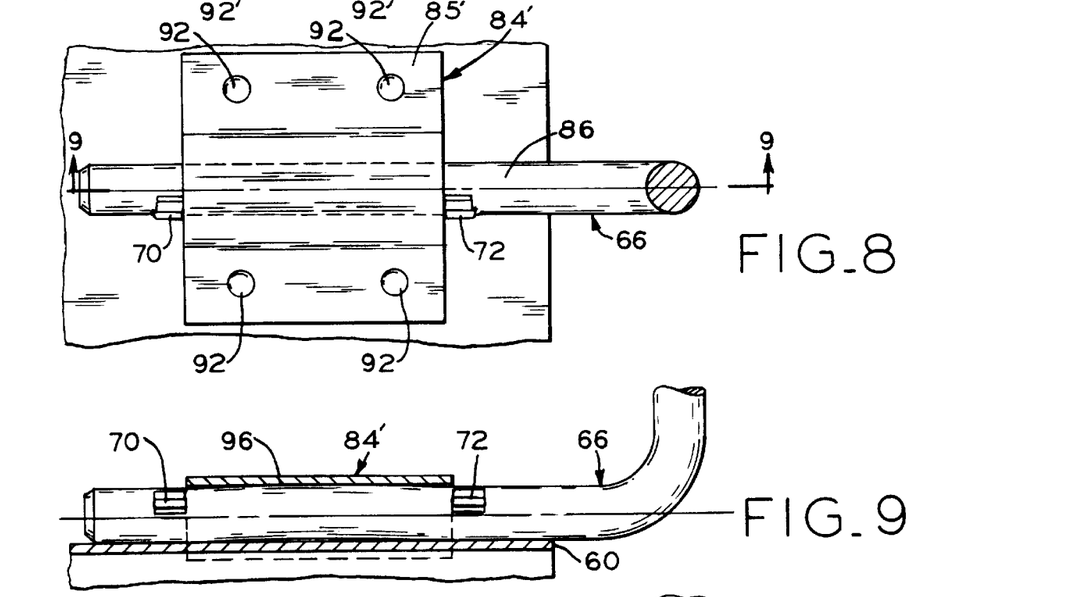
FIG. 8 is a plan view of the retainer of FIG. 6 with the retaining arm rotated to a mounting position.
FIG. 9 is an elevation view of FIG. 8.

FIGS. 8 and 9 are top and side views showing the bracket 66 rotated into a normal mounting position, i.e., rotated 90° from the position of FIG. 7 so that protruding ears 70, 72 engage opposite sides of strap 87' and capture the bracket within the member 84'. FIGS. 7 and 9 also show the bow in bracket 66 at 96. As shown, the bow is formed in bracket 66 in a plane aligned generally with swaged ears 70,72 so that the bowed section bears against the inner upper surface of retention member portion 84' when the bracket is aligned in a mounting configuration, with the portions of bracket 66 on either side of the bowed section bearing against the outer motor shell 60.

Figure 10:
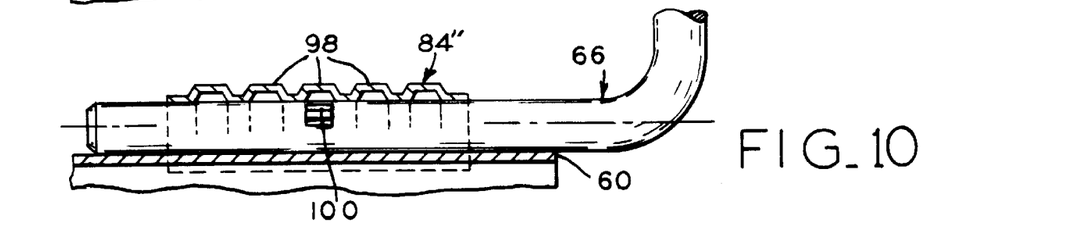
FIG. 10 is an elevation view corresponding to FIG. 8 and showing an alternate form of my inventive mounting system.

FIG. 10 illustrates an alternate embodiment of the retention member 84' in which the member 84" is formed with a plurality of corrugations 98 each sized to fit snugly about a single swaged ear 100 on bracket 66. In this embodiment, only a single ear 100 is required to prevent axial movement of bracket 66 in either a forward or reverse direction. The outline shape of member 84" remains the same as member 84 so that bracket 66 slips into the member 84 with the ear 100 aligned generally angularly oriented toward shell 60. When bracket 66 is rotated into a normal position for mounting of the motor to a blower housing, the ear 100 slips into one of the corrugations 98 to retain the bracket axially. Multiple corrugations 98 permit axial positioning of bracket 66 with respect to the shell 60 to accommodate variations in blower housing construction and/or variations in bracket size. Bowing of bracket section 86 may still be used for snug fitting to reduce vibration.

Figure 11:
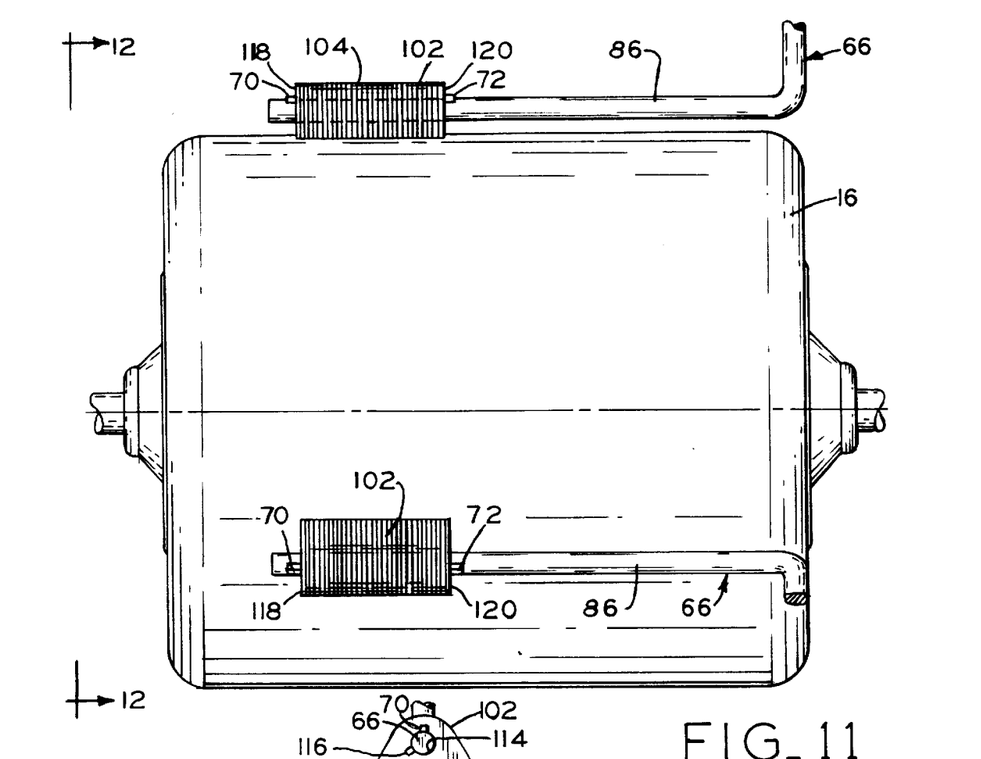
FIG. 11 is a side view of a blower motor incorporating another form of my inventive mounting system.
Figure 12:
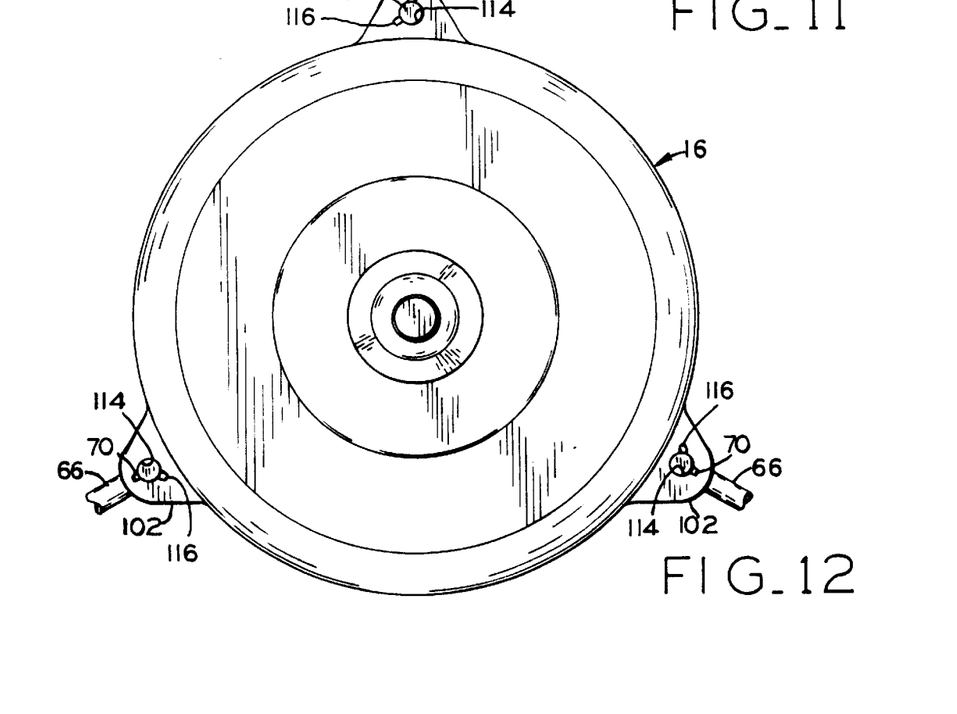
FIG. 12 is an end view of the system of FIG. 11.
Figure 13:
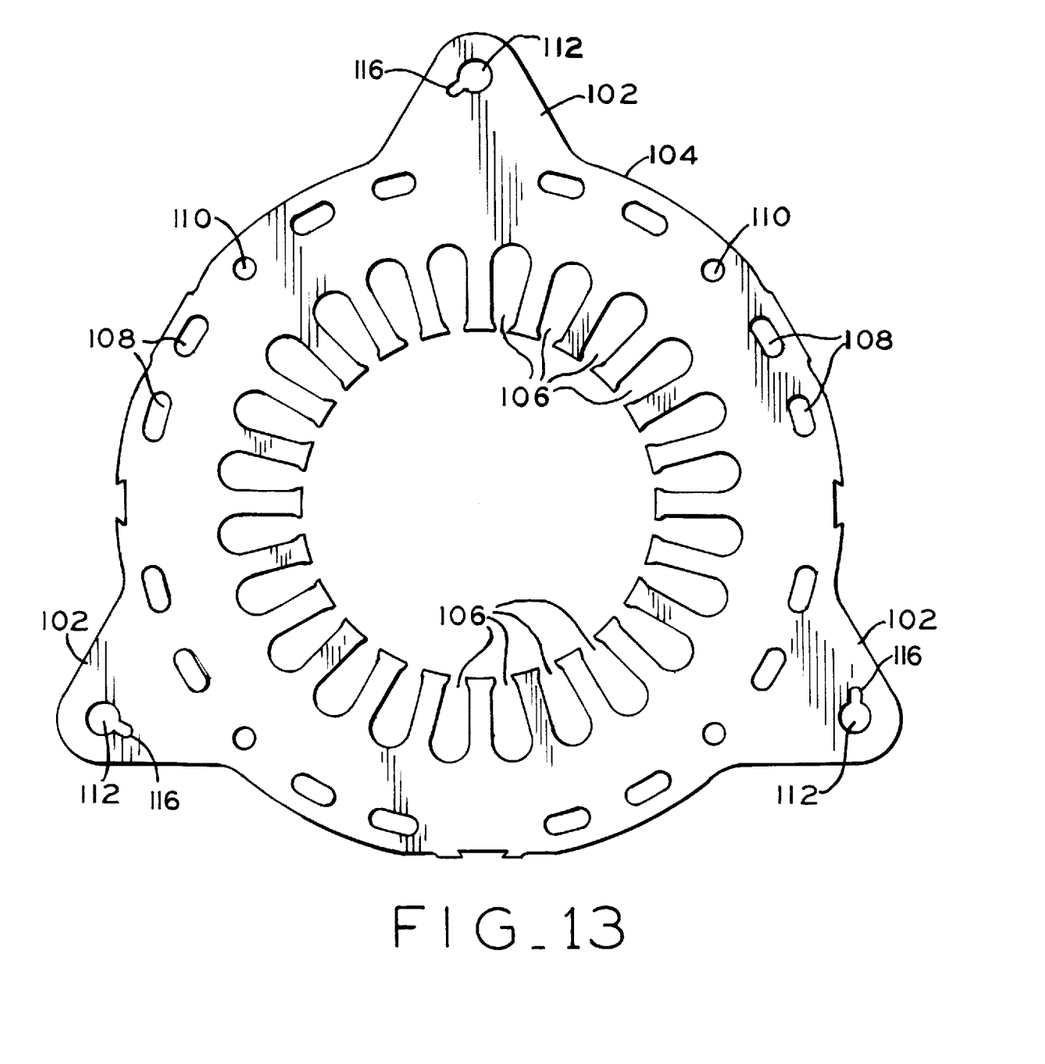
FIG. 13 illustrates a motor lamination for use in the mounting system of FIG. 11.

Turning now to FIGS. 11, 12 and 13, there is shown still another embodiment of the present invention in which the retention member 84 is eliminated and replaced by lobular elements 102 formed integrally with the stacked laminations 104 of motor 16. Each lamination 104 is stamped from sheet metal in a well known manner. In the present invention, the stamping die (not shown) is created to produce a lamination substantially as shown in FIG. 13 and includes a plurality of internal slots 106 for receiving motor windings, spaced apertures 108 for cooling air and passages 110 for mounting bolts. A plurality of such laminations are stacked to a predetermined thickness to form a portion of the motor stator. When properly stacked, oblong, oval or tear-drop shaped holes 112 formed in each element 102 align to form a passageway 114 through the stacked laminations. When the motor is assembled, the lobes 102 extend outward beyond the motor shell 60. The brackets 66 are adapted to slide through the passageway 114 when the swaged ears 70,72 are aligned with the enlarged portion 116 of the triangular- or tear drop-shaped passageway 114, i.e., when the bracket 66 is rotated to a preselected, non-mounting position, a mounting position being that position in which the brackets are aligned for attachment to a blower housing. Once the bracket 66 is inserted into the passageway 114, the bracket can be rotated to a mounting position such that the swaged ears 70, 72 engage opposite surfaces 118,120 of the stacked laminations so as to firmly restrain the bracket to the laminations and minimize vibration between the bracket and laminations. It may also be preferable to include a slight bow in bracket 66 so that the bracket binds in the passageway 116 similar to the binding of the bracket within the retention member 84.

Figure 14:
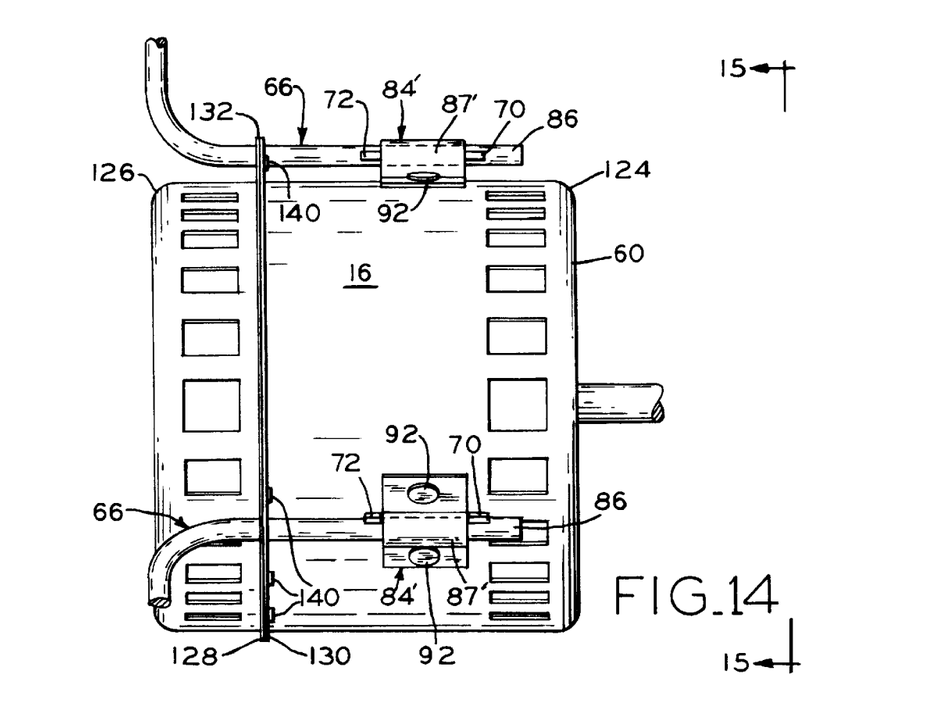
FIG. 14 illustrates another form of my inventive mounting system.
Figure 15:
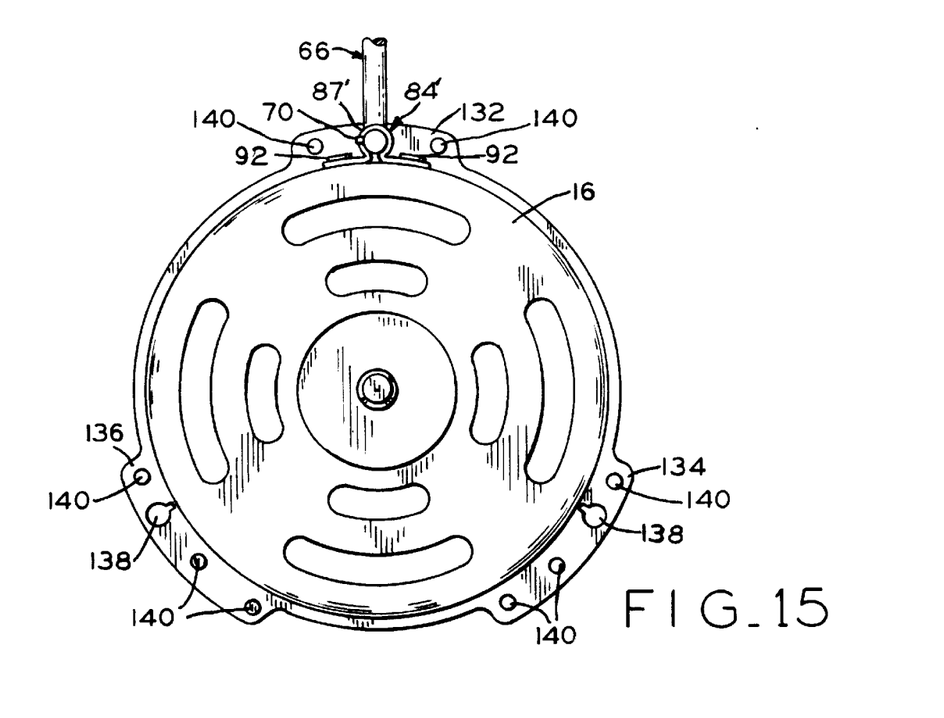
FIG. 15 is an end view of the mounting system of FIG. 14.

Still another embodiment of the present invention is illustrated in FIGS. 14 and 15. In this embodiment, the motor housing 60 is formed as two separate sections 124 and 126. The section 124 is essentially a deep-drawn can which fits about the motor stator and end windings. The section 126 is an end cap formed in the same method as can section 124 but not so deeply drawn. Both the cap and can are formed with radially extending flanges 128, 130 respectively, which mate against each other when the cap and can are positioned about the motor stator and windings. The flanges 128 and 130 are fastened to each other to couple the cap 126 to the can 124 and completely enclose the motor. The coupling method may be any of various means known in the art such as, for example, bolts or welding, but a preferable method of coupling the flanges is by use of the aforementioned TOG-L-LOC® connecting system by fastening, for example, at location 140. As shown in FIG. 15, the flanges 128, 130 are formed with three equally circumferentially spaced flange extensions 132, 134 and 136, each of which are of sufficient radial dimension to accommodate the selected fastening means and to provide an aperture 138 for receiving bracket 66. Retention members 84' (or member 84) are attached to the outer surface of the can 124 in axial alignment with a respective one of each of the flange extensions 132, 134, 136. Retention members 84', such as that shown in FIG. 7, may be attached to the can 124 by means of the aforementioned TOG-L-LOC® fastening system as described with respect to FIG. 6.

Each of the flange extensions 132, 134, 136 includes the enlarged aperture 138 which is sized and configured to pass an end of the bracket 66 when the bracket is rotated into a preselected non-mounting position. The mounting aperture or hole 138 is so positioned within the flange extensions that an end 86 of a bracket 66 can pass through the mounting hole and through the strap 87' of retention member 84'. Once the bracket end 86 has passed through the strap 87', the bracket 66 can be rotated to bring the swaged protuberances or ears 70, 72 into an orientation that locks the bracket 66 into the strap 87' as previously described with regard to the embodiment of FIG. 7. Preferably, the swaged protuberances 70 and 72 are spaced apart a distance which is slightly less than the width of the strap 87' so that when the bracket 66 is rotated to position the swaged ears 70 and 72 in a locking position, the ears will bite into or bind against the edges of the strap 87' and thus tightly restrain the bracket 66 in position.

It will be noted that the strap 87' is modified in FIG. 15 as compared to the form shown in FIG. 7. The modified strap 87' fits more snugly about bracket end 86 and reduces play between the bracket and strap. With this strap configuration, installation of bracket 66 requires that the bracket be oriented so that the ears 70, 72 point radially inward toward the motor 16. The strap 87' in this form also simplifies manufacture in that the strap is now bent from a rectangular sheet, as discussed with regard to FIG. 7, without requiring a punch operation to create the strap from a base 85 as described with respect to FIG. 5. Note that the central, rounded portion of strap 87' can be formed using a conventional roll-form process and can be sized to snugly fit about bracket 66 so as to eliminate any need to form a bow in bracket 66.

The improved mounting shown in FIGS. 14 and 15 provides a two-point support for the bracket 66. More particularly, the bracket 66 is now supported adjacent its end in the retention member 84' and also supported at a distal location by the flanges 128, 130. This two-point mounting of each bracket provides additional stability in the bracket mounting system and also provides additional support for the motor.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A vibration isolating mounting system in combination with an electric motor comprising:

a plurality of mounting arms, each of said mounting arms including a first segment extending generally parallel to an axis of the motor and a second segment extending generally perpendicular to said first segment, said second segment having an end distal from said first segment formed with a termination adapted for attaching said segment to a support, said first segment having an end distal from said second segment formed with at least a pair of spaced protrusions extending generally perpendicularly from said first segment; and a plurality of circumferentially spaced retainers on said motor each adapted for passage therethrough of a respective one of said ends of said first segments when each said first segment is rotationally positioned to align said spaced protrusions in a first direction, said first segment being axially retained in said retaining means after passage therethrough when said first segment is rotated to align said protrusions away from said first direction.

2. The mounting system of claim 1 wherein said plurality of retaining means comprises a plurality of metal straps circumferentially spaced about and extending above an outer surface of the motor, each of said straps forming a generally triangular-shaped opening aligned generally parallel to the axis of the motor for receiving a respective one of said ends of said first segments, said ends of said first segments passing through said straps when said first segment is rotated to align said protrusions in said first direction, said protrusions reacting against an edge of said straps for retaining said first segments therein when said first segment is rotated out of said first position.

3. The mounting system of claim 2 wherein said straps are integrally formed in a housing of the motor.

4. The mounting system of claim 2 wherein said straps are integrally formed in a band circumscribing the motor.

5. The mounting system of claim 2 wherein said straps are formed in brackets attachable to a circumscribing shell of the motor.

6. The mounting system of claim 5 wherein said straps are attached to the shell by TOG-L-LOC® fastening.

7. The mounting system of claim 1 wherein said retainer comprises a plurality of circumferentially spaced lobes formed in laminations of the motor and having apertures extending therethrough parallel to the axis of the motor, said apertures being configured to pass said ends of said first segments when said first segments are rotationally positioned in said first direction.

8. The mounting system of claim 1 wherein said first segment between at least said pair of protrusions is bowed.

9. The mounting system of claim 8 wherein said pair of protrusions are spaced apart a distance substantially equal to a width of said retainers wherein said protrusions abut against opposite sides of said retainers.

10. In combination, a vibration isolating system for mounting an electric motor to a support therefor, the system combination comprising:

at least one retaining means arranged for disposition at least adjacent a circumferential part of the motor, said at least one retaining means including a pair of opposite end portions, and a passage defined at least in part in said at least one retaining means so as to extend generally parallel to the axis of said motor between said opposite end portions; and at least one mounting means movable between a pair of positions with respect to said at least one retaining means and arranged for mounting in association between the motor and the support, said at least one mounting means including a pair of angularly arranged segments, one of said segments being received through said passage in said at least one retaining means when said at least one mounting means is in one of its positions and the other of said segments being disposed for mounting in association with the support when said at least one mounting means is in the other of its positions, and a pair of spaced apart lobes on said one segment, one of said lobes being received through said passage when said at least one mounting means is in its one position and said lobes being respectively engaged with said opposite end portions of said at least one retaining means to retain said one segment against axial displacement movement from said passage only when said at least one mounting means is in its other position.

11. The combination of claim 10 wherein the vibration isolating system includes a second retaining means axially displaced from and circumferentially aligned at least in part with said first retaining means, said second retaining means including a passage therethrough for receiving said one of said segments of said at least one mounting means, said at least one mounting means being coupled to the electric motor at both said at least one retaining and said second retaining means.

12. The combination of claim 11 wherein said passage through said second retaining means is shaped to pass said one of said segments only when said one of said segments is rotated into said one of its positions.

13. The combination of claim 11 wherein said flange is formed integrally with the motor.

14. The combination of claim 13 wherein the motor includes a housing having a first section and a second section, each section having a radially extending member adapted for mating with a radially extending member of the other section and said mating members forming said flange.

15. The combination of claim 14 and including a plurality of fasteners coupling said first section to said second section through said radially extending members.

16. The combination of claim 15 wherein said fasteners comprise TOG-L-LOC® fasteners.

17. The combination of claim 14 wherein said flange comprises a plurality of discontinuous flange elements circumferentially spaced about the motor.

18. The combination of claim 17 and including at least one mounting means operably associated with each of said flange elements.

19. The combination of claim 10 wherein said second retaining means comprises a flange extending radially outward of the motor.

20. The combination of claim 10 and including an arcuate section formed in said one of said segments at least between said pair of spaced lobes for establishing an interference fit between said one of said segments and said at least one retaining means when said one of said segments is rotated into said other of its positions.

21. In combination, an electric motor and a vibration isolating system therefor, the vibration isolating system comprising:

at least one set of supporting means for disposition generally in coaxial alignment with each other at least adjacent a circumferential part of the electric motor and arranged generally parallel to the axis of the electric motor, a set of passages generally coaxially aligned with each other in said supporting means of said at least one supporting means set, and at least one of said supporting means of said at least one supporting means set including a pair of opposite end portions respectively intersecting one of said passages in said at least one supporting means; and at least one mounting means movable between a pair of positions with respect to said supporting means of said at least one supporting means set and arranged for mounting in association between the electric motor and a support, said at least one mounting means including a pair of angularly arranged segments, one of said segments being received through said passages in supporting association with said supporting means of said at least one supporting means set when said at least one mounting means is in one of its positions and the other of said segments being disposed for mounting in association with the support when said at least one mounting means is in the other of its positions, and a pair of means on said one segment for respective engagement with said opposite end portions on said at least one supporting means, one of said engagement means being received through each of said passages and the other of said engagement means being received through only at least another of said passages when said at least one mounting means is in its one position, and said engagement means being respectively engaged with said opposite end portions of said at least one supporting means to retain said one segment against axial displacement movement from said passages at least when said at least one mounting means is in its other position.

22. The vibration isolating system as set forth in claim 21 wherein the electric motor includes a pair of housings defining at least in part the circumferential part of the electric motor, at least one flange on each housing extending adjacent each other beyond the circumferential part of the electric motor and arranged in axial aligned relation generally parallel to the axis of the electric motor.

23. The vibration isolating system as set forth in claim 22 wherein said at least one flange on each housing comprises another of said supporting means of said supporting means set, and said at least another passage extending through said at least one flange on each housing.

24. The vibration isolating system as set forth in claim 22 wherein said electric motor further includes means for securing the at least one flange on each housing against displacement from each other.

25. The vibration isolating system as set forth in claim 24 wherein said securing means comprise at least one fastener interconnecting said at least one flange on each housing against displacement from each other.

26. The vibration isolating system as set forth in claim 21 wherein said at least one supporting means comprises a split cylindric casing integrally interposed between a pair of opposite side extensions, said opposite end portions being defined on said split cylindric casing and said at least one passage extending through said split cylindric casing, and means for securing said opposite side extensions to the circumferential part of the electric motor, respectively.

27. The vibration isolating system as set forth in claim 26 wherein said securing means comprise a plurality of fasteners interconnecting said opposite side extensions and the circumferential part of the electric motor, respectively.

28. The vibration isolating system as set forth in claim 21 wherein said engagement means comprise a pair of axially spaced apart lobes on said one segment.

* * * * *